United States Patent
Kumar et al.

(10) Patent No.: US 6,507,568 B2
(45) Date of Patent: *Jan. 14, 2003

(54) ENHANCED ACCESS IN WIRELESS COMMUNICATION SYSTEMS UNDER RAPIDLY FLUCTUATING FADING CONDITIONS

(75) Inventors: Sarath Kumar, Eatontown, NJ (US); Wen-Yi Kuo, Parsippany, NJ (US); Kiran M. Rege, Marlboro, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,996

(22) Filed: Aug. 27, 1997

(65) Prior Publication Data

US 2001/0043578 A1 Nov. 22, 2001

(51) Int. Cl.[7] .................................................. H04Q 7/00
(52) U.S. Cl. ........................ 370/329; 455/525; 375/349
(58) Field of Search ................................ 370/335, 342, 370/331, 332, 334, 252, 441, 329; 455/436, 442, 524, 525; 375/347, 349, 267, 148

(56) References Cited

U.S. PATENT DOCUMENTS

| | | | | |
|---|---|---|---|---|
| 5,109,390 A | * | 4/1992 | Gilhousen et al. | 370/335 |
| 5,267,261 A | * | 11/1993 | Blakeney, II et al. | 370/332 |
| 5,652,748 A | * | 7/1997 | Jolma et al. | 370/320 |
| 5,809,019 A | * | 9/1998 | Ichihara et al. | 370/334 |
| 5,854,785 A | * | 12/1998 | Willey | 370/332 |
| 5,883,888 A | * | 3/1999 | St-Pierre | 370/331 |
| 5,907,586 A | * | 5/1999 | Katsuragawa et al. | 370/342 |
| 5,933,787 A | * | 8/1999 | Guilhousen et al. | 375/347 |
| 6,005,855 A | * | 12/1999 | Zahavi et al. | 370/335 |
| 6,021,122 A | * | 2/2000 | Tiedemann, Jr. | 370/331 |
| 6,308,054 B2 | * | 10/2001 | Ogino et al. | 455/134 |

OTHER PUBLICATIONS

"A Channel Assignment into Soft Handoff, Access Entry Handoff, and Access Handoff" by Ed Tiedermann and Jun Wang, QUALCOMM, Incorporated, dated Feb. 24–28, 1997, pp. 1–2.

* cited by examiner

*Primary Examiner*—Seema S Rao
(74) *Attorney, Agent, or Firm*—J. J. Opalach; Mendelsohn and Associates PC

(57) ABSTRACT

A mobile communications system employs extended channel assignment messaging during the call setup portion of a mobile call. As part of the call setup process, a mobile station sends an access request message to a primary base station that includes a list of alternate base stations. As call setup continues, the mobile station employs diversity reception in monitoring the paging channel of three base stations, each selected as a function of the strength of the signal-to-noise ratios of their respective pilot tones.

5 Claims, 4 Drawing Sheets

300

100

ENHANCED ACCESS IN WIRELESS COMMUNICATION SYSTEMS UNDER RAPIDLY FLUCTUATING FADING CONDITIONS

FIELD OF THE INVENTION

This invention relates generally to communications and, more particularly, to wireless systems.

BACKGROUND OF THE INVENTION

In a wireless multiple access communication system, high success rate of "call setup" in the access state (versus the conversation state) is a critical performance requirement. For CDMA (code division multiple access) systems based on industry standards IS-95A or ANSI J-STD-008, the success rate of call setup can be relatively poor in areas characterized by rapidly fluctuating fading conditions.

In these systems, a mobile station monitors the received signal-to-noise ratios of pilot signals from a number of base stations. During call setup, the mobile station selects the base station with the strongest measured received pilot signal and attempts call setup communications with only the selected base station. (This is in contrast to "soft hand-off," which occurs during the conversation state and in which the mobile station communicates with a plurality of base stations.) In call setup, the mobile station first provides an "access request message" to the selected base station and then listens to (i.e., decodes messages from) the paging, or reply, channel of the selected base station. However, in rapidly fluctuating fading conditions, the received signals from the selected base station are dynamically changing which can result in poor signal quality on the paging channel at the time a response to the access request is sent (in the form of a channel assignment message) by the base station. As a result, the mobile station may not detect the channel assignment message from the base station to complete a call setup (i.e., establish a connection so that the mobile station can enter a "conversation state"), thus requiring the mobile station to repeat the entire call setup process.

An alternative approach is to modify the call setup procedure so that the mobile station transmits an extended access request message to the selected base station that includes a list of pilot strength measurements. That is, the mobile station still communicates with a single base station during call setup, but the pilot measurements tell the selected, or primary, base station what other base stations might potentially become stronger than the primary base station (in terms of their pilot strength at the mobile receiver) in the near future. Once the CDMA infrastructure receives these measurements, and the identities of the corresponding base stations, an "extended channel assignment message" is subsequently simulcast to these candidate base stations, each of which (including the primary) sends a copy of the channel assignment message over their respective paging channels to the mobile station. In this approach, while waiting for the channel assignment message, if the mobile station detects that the pilot of the initially-selected primary base station fades, the mobile station then performs a hard hand-off and selects another base station to communicate with from the above-mentioned list. This is referred to herein as an "idle hand-off" during call setup.

Unfortunately, even with this latter approach there is still a period of time, albeit small, in which a mobile station may perform the idle hand-off too late and miss the channel assignment message from one of the alternate base stations, thus causing the mobile station to try the call setup procedure again.

SUMMARY OF THE INVENTION

In accordance with the invention, "soft access" is performed. In soft access, a wireless station decodes call setup communications from multiple base stations in parallel. As a result, message reception diversity is provided during the call setup phase, thereby improving the success rate of a call setup.

In an embodiment of the invention, it is assumed a mobile communications system employs the above-mentioned extended channel assignment messaging scheme. During the call setup phase, the mobile receiver employs diversity reception in monitoring the paging channel of multiple base stations, each selected as a function of the strength of the signal-to-noise ratios of their respective pilot tones.

DETAILED DESCRIPTION

Before describing the inventive concept, a prior art RAKE receiver 300 for use in a mobile station is described. It is assumed that a mobile station operates in one of three states of operation: no-call; access; and conversation. The no-call state is self-explanatory. The access state corresponds to the mobile station attempting call setup with a base station. The conversation state represents successful call setup and communications between a user of the mobile station and a called party. In each of the above-mentioned states, the structure of RAKE receiver 300 varies as illustrated in FIGS. 1, 2, and 3, respectively.

Figure 1:
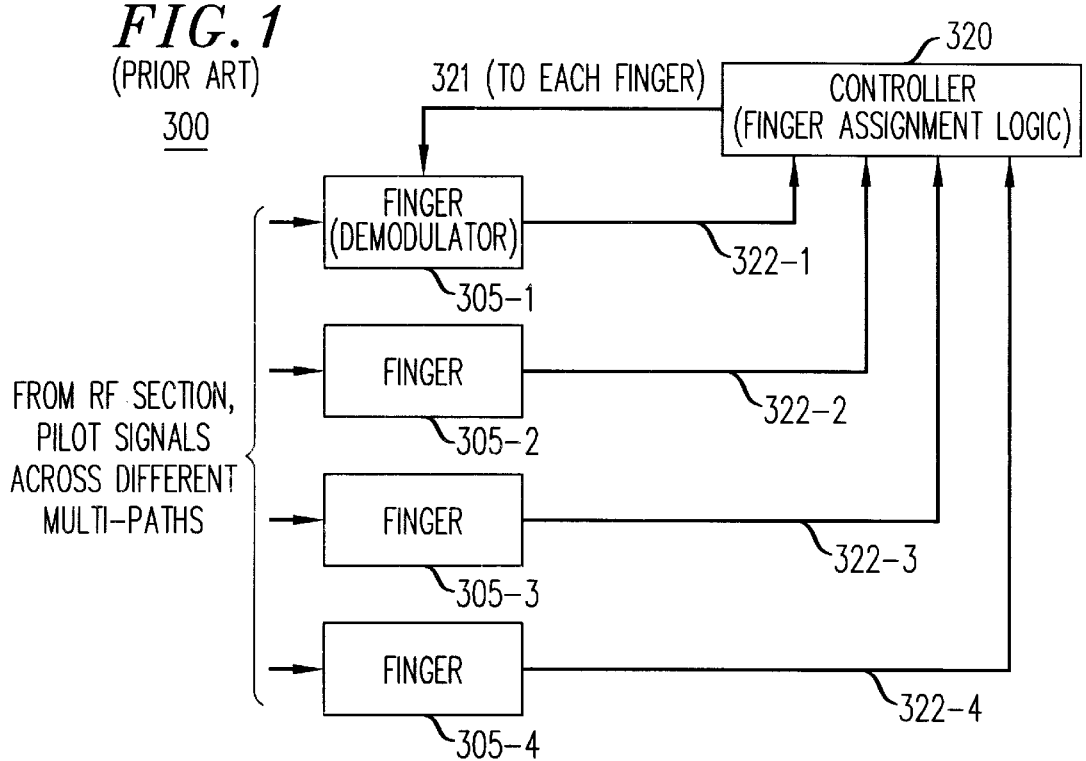
FIGS. 1, 2, and 3 show prior art RAKE receiver structures.

The structure of the RAKE receiver during the no-call state is shown in FIG. 1. RAKE receiver 300 comprises a number of demodulators N, each demodulator referred to herein as a "finger." In this example, N is equal to four. It is assumed that each demodulator also includes a received signal strength indicator (RSSI) (not shown) as known in the art. Controller 320 (also known in the art as "finger assignment logic" and which is illustratively micro-processor-based) controls each finger via signal 321. During the no-call state, each finger scans the various pilot signals from different base stations over different multi-paths and provides a signal representative of respective signal strength to controller 320, via signals 322-1 through 322-4. (The received pilot signals are provided to each finger by a radio-frequency (RF) section (not shown) of the mobile station.) Controller 320 uses this information to identify the current base station that is providing the strongest pilot signal, referred to below as the primary base station.

Figure 2:
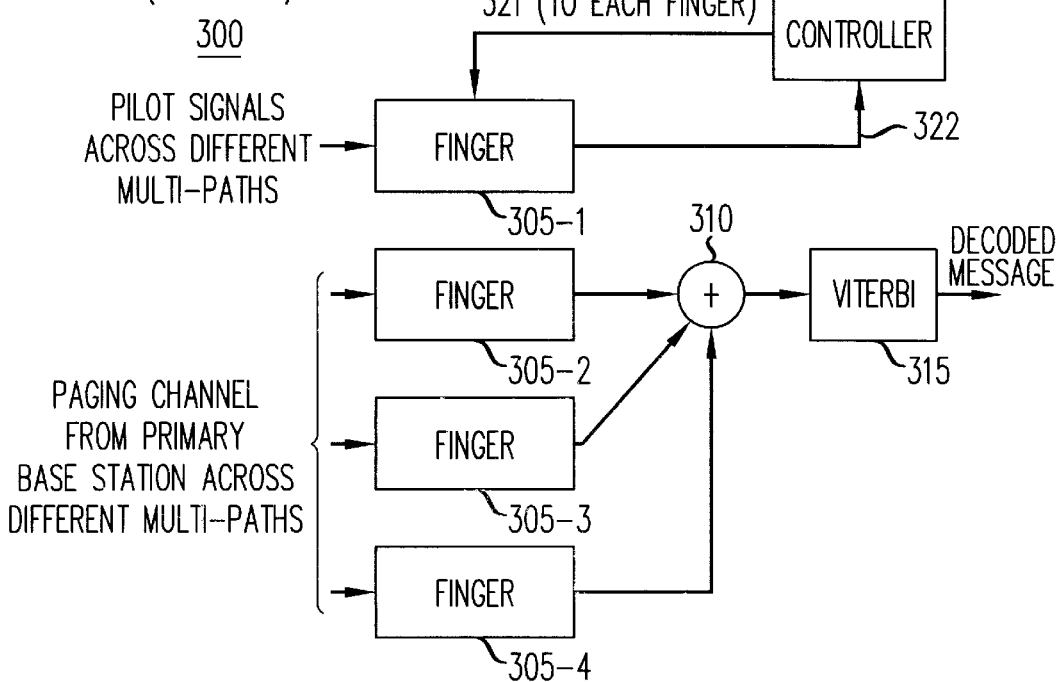
Figure 3:
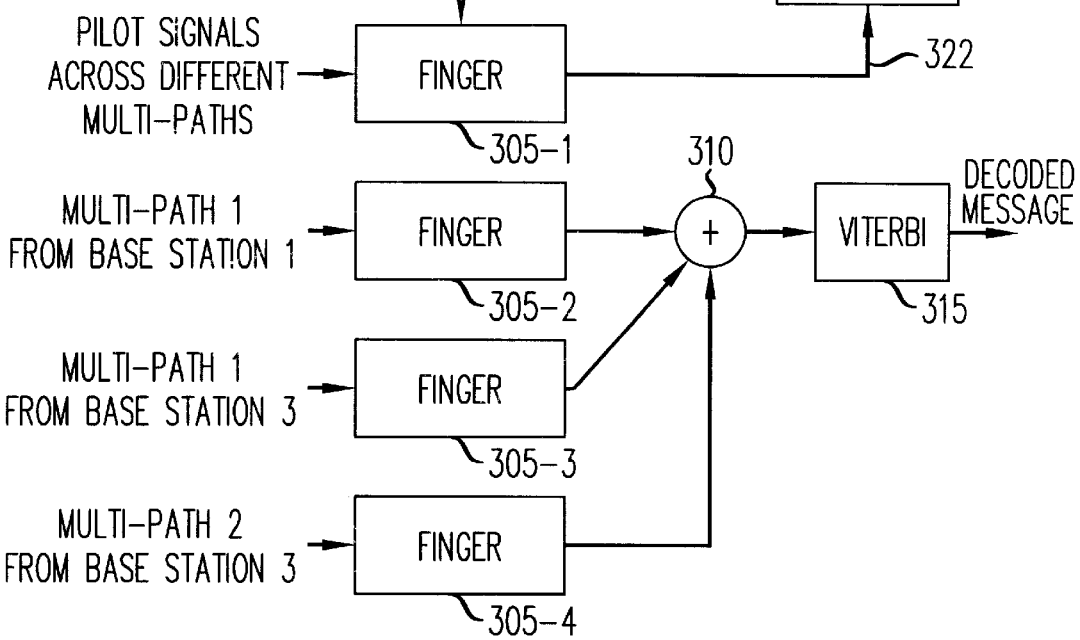

Once the access state is entered, e.g., by the pressing of a send button (not shown) on the mobile receiver, controller 320 changes the finger assignments of RAKE receiver 300 to the structure illustrated in FIG. 2. Controller 320 uses one finger (herein represented by finger 305-1) to continually monitor pilot strength measurements from each of the surrounding base stations (this is also known in the art as the "searcher finger"). Pilot strength information for respective base stations is provided via signal 322. During the access state, an access request message (which could also be of the extended form as described earlier) is transmitted by the mobile station to the primary base station as determined during the no-call state. Each of the remaining fingers are designated to demodulate the paging channel of the primary base station via different multi-paths (in this illustrative structure up to three different multi-paths can be monitored). The output signal from each of these remaining fingers are applied to combiner 310 (the latter may include delay elements to compensate for small delays in each received signal and combines the signal at the "symbol" level). (It should be noted that the signals from each of these remaining fingers are combined since they represent the same paging signal coming from different multi-paths. That is, once the compensation for the different multi-paths is applied, there is little destructive interference between these signals.) The resulting signal from combiner 310 is applied to Viterbi decoder 315, which includes a de-interleaver (not shown). Viterbi decoder 315 provides a decoded message, in this case from the paging channel of the primary base station.

During the access state, as noted above, the mobile station only communicates with one base station at a time. This occurs even during the above-mentioned idle hand-off. In this instance, controller 320 of FIG. 2 uses the information from finger 305-1 for switching the remaining fingers to demodulate the paging channel of a different base station should the pilot signal strength of the primary base station fade below a predetermined signal strength level, which could be absolute or relative to a predetermined reference.

Once the conversation state is entered, controller 320 changes the finger assignments to the structure shown in FIG. 3. This structure is similar to the structure shown in FIG. 2 except that in the conversation state the RAKE receiver is configured to support "soft hand-off." In a "soft hand-off" zone (the geographical area that has roughly equal path losses from several surrounding base stations and which is usually but not necessarily at the edge of a cell), good system performance can be maintained only when soft hand-off (i.e., a condition where the mobile station talks to several base stations at the same time) is utilized. Controller 320 uses one finger (herein represented by finger 305-1) to continually monitor the multi-paths being received from each of the surrounding base stations by performing pilot strength measurements at appropriate phase offsets. Pilot strength information for respective base stations is provided via signal 322. Each of the remaining fingers are assigned to demodulate the traffic channels (across different multi-paths) being used by the base stations that are in soft hand-off with the mobile station to communicate with the latter. The selection of which multi-path should be demodulated is under the control of controller 320. In this example, finger 305-2 is assigned to receive a signal from a base station 1 that is designated as "multi-path 1." Finger 305-3 is assigned to a signal from a base station 3 denoted as multi-path 1. Similarly, finger 305-4 is assigned to another multi-path signal also from base station 3, i.e., multi-path 2. The output signal from each of these remaining fingers are applied to combiner 310, which provides an output signal to Viterbi decoding element 315. (Output signals of fingers locked to different multi-paths of different base stations can be combined at the symbol level because of the synchronization between base stations in transmitting to the mobile receiver during a soft hand-off) In contrast to the above-mentioned access state, the mobile station effectively communicates with more than one base station at a time during a soft hand-off in the conversation state.

Figure 4:
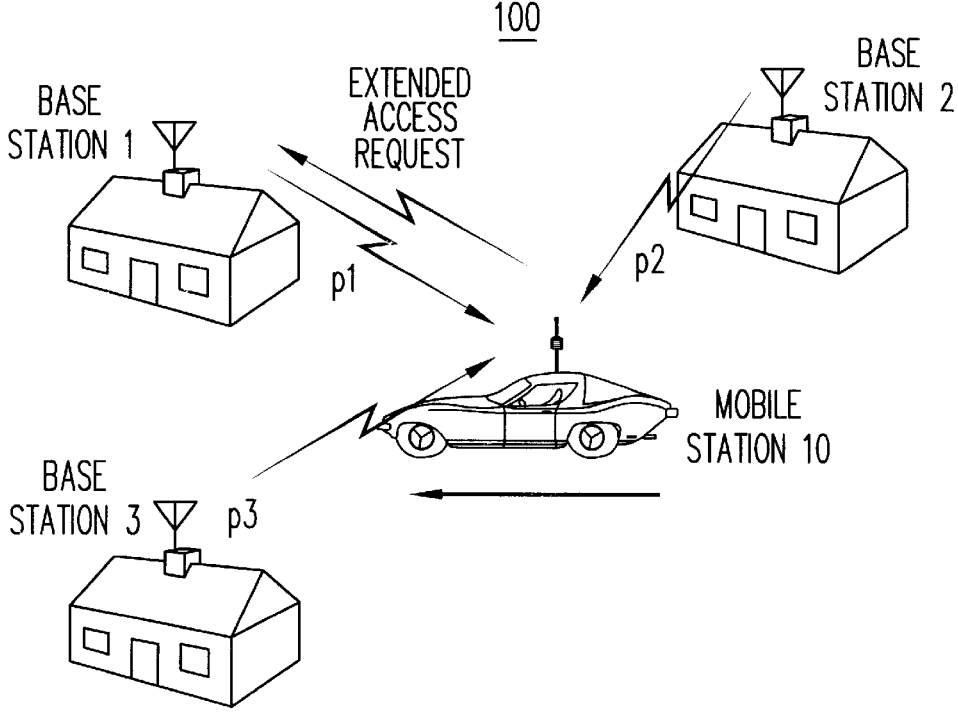
FIG. 4 shows a portion of a mobile communications system embodying the principles of the invention.

Turning now to FIG. 4, a portion of a CDMA mobile communications system 100 embodying the principles of the invention is shown. Except as noted below, it is assumed that the CDMA mobile communications system conforms to industry standard IS-95A. Portion 100 comprises three base stations: 1, 2, and 3; and a mobile station 10, which is illustratively represented by a vehicle icon. The three base stations and the mobile station are representative of wireless endpoints. Other than the inventive concept, the elements shown in FIG. 4 are well-known and will not be described in detail. Each base station transmits a pilot signal: p1, p2, and p3, respectively. Generally speaking, mobile station 10 is in one of above-mentioned three states of operation: no-call; access; and conversation.

In accordance with the principles of the invention, mobile communications system 100 performs "soft access." As described further below, in soft access, a wireless station decodes call setup communications in the access state from multiple base stations in parallel. As a result, message reception diversity is provided during the call setup phase, thereby improving the success rate of a call setup.

In this illustrative embodiment of the invention, it is assumed mobile communications system 100 employs the above-mentioned extended channel assignment messaging scheme. During the access state, mobile receiver 10 employs diversity reception in demodulating the paging channel of the three base stations, each selected as a function of the strength of the signal-to-noise ratios of their respective pilot tones. At this time, reference should also be made to FIG. 5 which shows an illustrative method embodying the principles of the invention.

Figure 5:
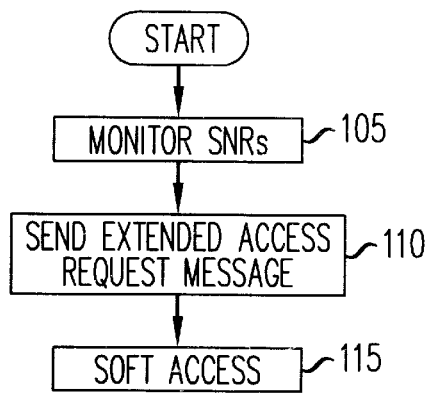
FIG. 5 shows an illustrative flow chart embodying the principles of the invention.

In step 105, of FIG. 5, mobile station 10, in the no-call state, monitors the signal-to-noise ratio (SNR) of a plurality of received pilot signals from each base station using the above-described RAKE receiver. Upon, e.g., pressing of the "send" button (not shown) of mobile station 10, the access state is entered, i.e., to establish a call. In step 110, mobile station 10 selects, e.g., base station 1 as the primary base station (based upon the measured SNR of the received pilot signal from base station 1) and transmits an extended access message to base station 1. The extended access message includes pilot strength measurements above a predetermined threshold of other alternative base stations as well as the identities of those base stations. In this example, the alternative base stations are base station 2 and base station 3. Mobile station 10 completes the call establishment using soft access in step 115.

Figure 6:
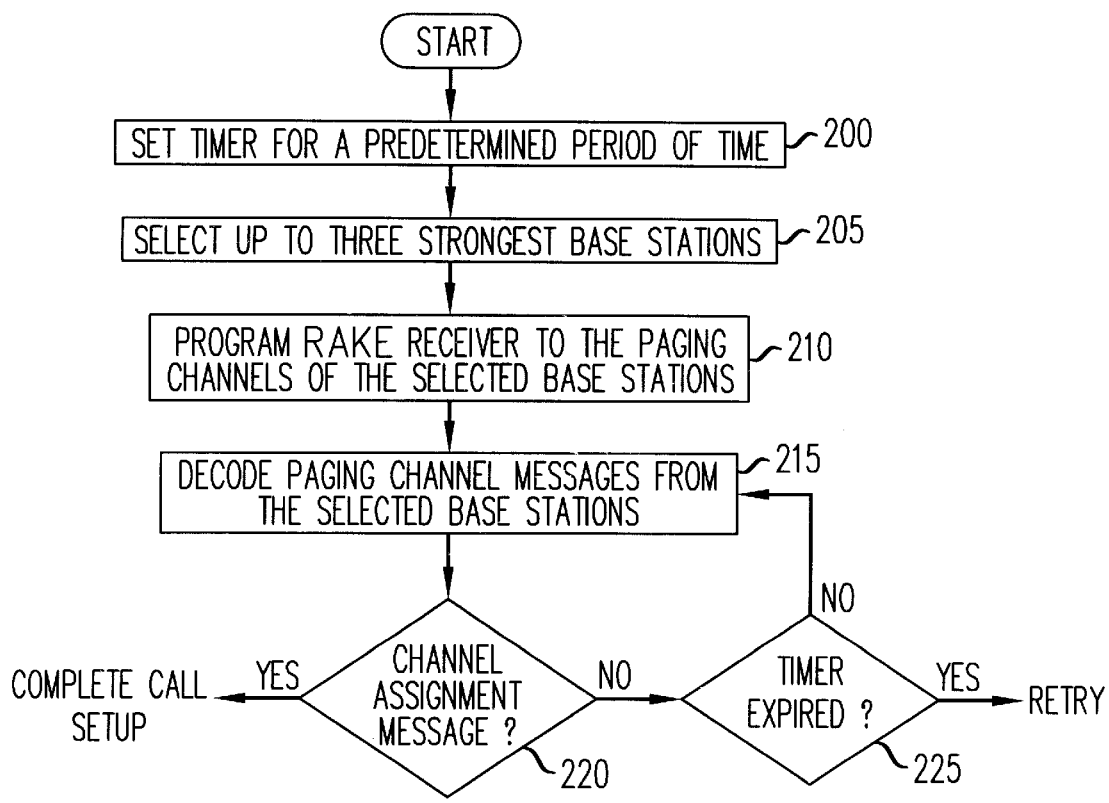
FIG. 6 shows an illustrative flow chart for use in providing soft access in accordance with the principles of the invention.

An illustrative method for use in performing soft access is shown in FIG. 6. In step 200, as soon as the extended access message is transmitted, mobile station 10 sets a timer for a predetermined period of time, e.g., 5 seconds. In step 205, mobile station 10, uses a selection criteria (e.g., a predetermined SNR), to select a number, M, of base stations with the strongest received SNR pilot signals above a predetermined threshold. Here, M is illustratively equal to 3. (Since both the cellular infrastructure and mobile station 10 use identical selection criteria in combination with the same set of pilot strength measurements, both will identify the same set of base stations as candidates for simulcasting.) In step 210, the RAKE receiver of mobile station 10 is programmed to receive and decode the predefined paging channels of the selected base stations. That is, and referring briefly to FIG. 7 described below, mobile station 10 uses the "searcher finger" 405-1 to monitor, on a continual basis, the multi-paths being received from the selected base stations and uses the information provided by the "searcher finger" to dynamically assign the remaining fingers (405-2, 405-3, and 405-4) of the RAKE receiver to demodulate the paging channel by locking on to the three strongest multi-paths being received from these base stations. In step 215, the RAKE receiver, provides, in parallel, the decoded paging channel messages from the selected base stations on the strongest multi-paths. As such, and in accordance with the principles of the invention, this method provides message reception diversity even for the channel assignment message, thereby improving the success rate of call setups. In step 220, if a channel assignment message is detected, mobile receiver 10 completes call setup as instructed in the channel assignment message. However, if no channel assignment message is detected, a check is made in step 225 if the above-mentioned timer has expired (this can also be performed via an interrupt-driven timer). (It can take a good portion of a second or several seconds for the network infrastructure to deliver the channel assignment message from the time the mobile station sends out an access message requesting connection.) If the time delay has not expired, mobile receiver 10 continues to decode incoming paging messages until detection of an extended channel assignment message. If the time delay expires before receipt of an extended channel assignment message, then mobile receiver 10 restarts the call setup process.

Figure 7:
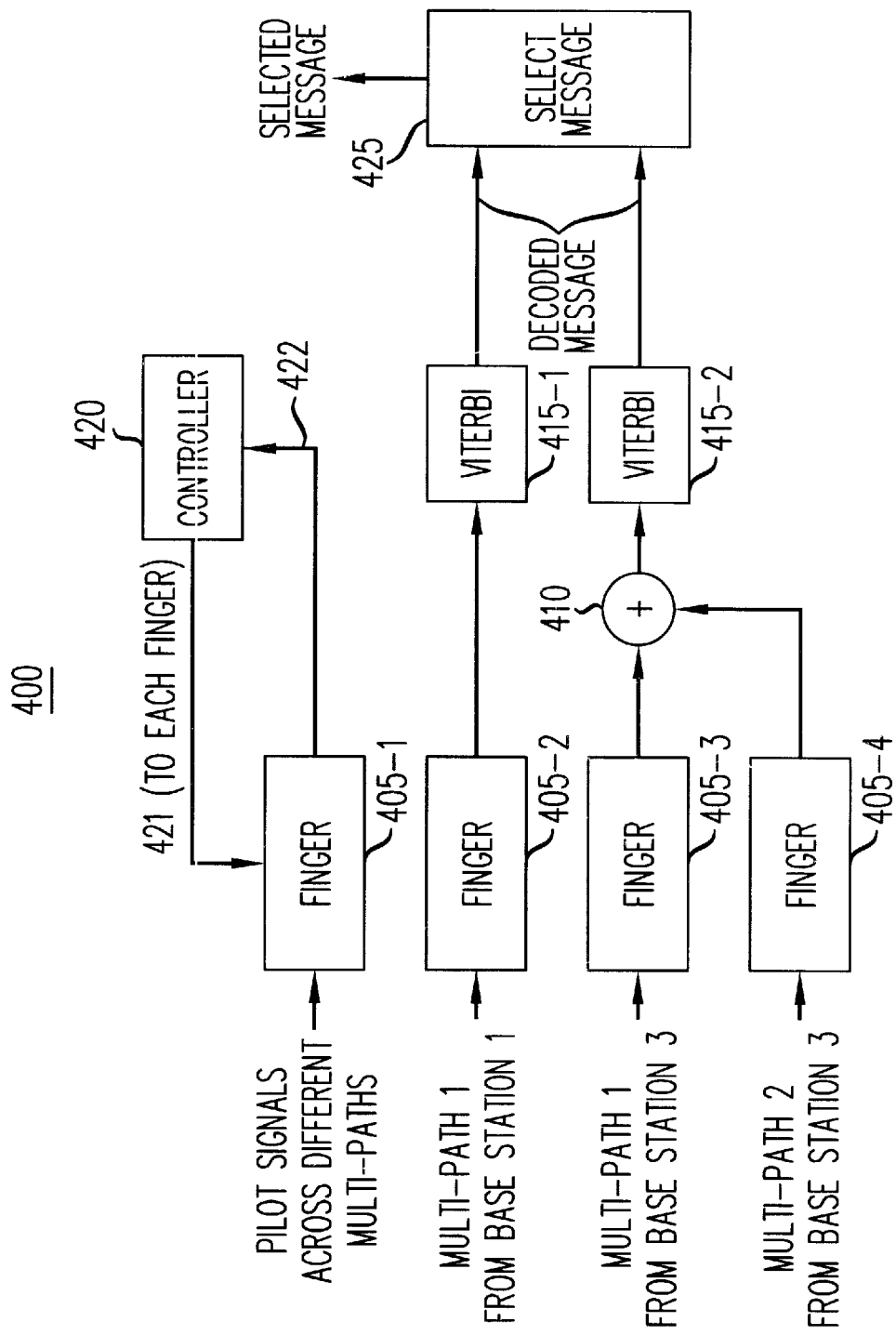
FIG. 7 shows an illustrative RAKE receiver structure in accordance with the principles of the invention.

In accordance with the principles of the invention, mobile station 10 uses its "finger assignment logic" in combination with the "searcher finger" to continually monitor the multi-paths it receives from the selected base stations and locks the remaining fingers on to what, it believes, are the strongest of these multi-paths. This enables the mobile station to benefit from diversity even during the reception of the channel assignment message. An illustrative RAKE receiver structure 400 is shown in FIG. 7.

RAKE receiver 400 comprises a plurality of "fingers," e.g., finger 405-1, 405-2, 405-3, and 405-4. Controller 420 performs finger assignment and uses one finger (herein represented by finger 405-1) to continually monitor pilot strength measurements from each of the surrounding base stations (this is the above-mentioned "searcher finger"). Pilot strength information for respective base stations is provided via signal 422. During the access state, an extended access request message is transmitted by mobile station 10 to the primary base station as determined during the no-call state (e.g., assumed to be base station 1). All other fingers (i.e., those other than the "searcher finger") are assigned to demodulate the paging channels of the base stations that will be simulcasting the channel assignment message to the mobile station. Controller 420 uses the pilot strength information being provided by the "searcher finger" to identify the strongest multi-path(s) being received from these base stations and assigns these fingers to lock onto those multi-paths to demodulate the paging channels. In this example, finger 405-2 is assigned to lock on to a multi-path 1 of base station 1 (which happens to be the primary base station) for demodulating the paging channel of base station 1. Fingers 405-3 and 405-4 are locked on to multi-paths 1 and 3 of base station 3 for demodulating the paging channel of base station 3. (Note, that the primary base station is simply one of a (possible) plurality of sources of the simulcast channel assignment message. As such, due to fading, it may be the case that no fingers of the RAKE receiver are demodulating the paging channel of the primary base station at a particular time). Since the paging channels of different base stations are not synchronized in time, the output signals of the fingers assigned to different base stations cannot be combined at the symbol level. This is shown in FIG. 7. Viterbi decoder 415-1 processes the output signal from finger 405-2, while Viterbi decoder 415-2 processes the combination of the output signals from fingers 405-3 and 405-4 as provided by adder 410. (As noted above, each Viterbi decoder is assumed to include a de-interleaver as known in the art.) Select message element 425 only looks for a channel assignment message intended for mobile station 10, ignoring other messages. (Although shown as a separate element, select message element 425 could be a part of controller 420.) Once a valid channel assignment message is received via any one of these fingers, mobile station 10 performs the action described in the channel assignment message (i.e., for instance, enter the conversation state, possibly in a soft hand-off mode if the message so indicates). On the other hand, if no valid channel assignment message is received over any of its fingers before the above-mentioned time delay expires then mobile station 10 exits its current "waiting for channel assignment message" state and resumes the access procedure.

In the above-described example, it was assumed that the number of fingers was equal to four. However, the inventive concept is readily applied to RAKE receivers of different sizes. Also, in the above example of FIG. 7, it was assumed that mobile station 10 demodulates two multi-paths from base station 3. In the event that mobile station 10 demodulates a multi-path from all three base stations, an additional Viterbi decoder is required and combiner 410 is disabled since the output from finger 405-3 and 405-4 are provided to the respective separate Viterbi decoders. (It should be noted that one Viterbi decoder may be used in a time-division access mode such that it switches between each of the output signals of the corresponding fingers. Alternatively, parallel Viterbi decoder elements can be provided, each suitably enabled and disabled by controller 420 at the appropriate time.)

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context of IS-95A, the inventive concept is applicable to other cellular access schemes.

What is claimed:

1. A method for use in a wireless mobile station of a wireless communication system during an access state of the wireless communication system, the method comprising the steps of:

transmitting a message to at least one wireless base station of the wireless communication system, the message representative of a call setup state of operation;

demodulating different received signals from a plurality of wireless base stations of the wireless communication system representing a first reply channel, associated with a first wireless base station, and a second reply channel, associated with a second wireless base station, to provide a respective first demodulated signal and a second demodulated signal;

decoding the first demodulated signal to provide a first message;

decoding the second demodulated signal to provide a second message, wherein the decoding of the first demodulated signal is independent of the decoding of the second demodulated signal; and selecting one of the plurality of decoded messages for use in recovering channel assignment information.

2. A wireless mobile station for a wireless communication system, the mobile station comprising:

a transmitter configured, during an access state of the wireless communication system, to transmit a message representative of a call setup to at least one wireless base station of the wireless communication system; and a receiver configured, during the access state, to (a) demodulate different received signals from a plurality of wireless base stations of the wireless communication system representing a first reply channel, associated with a first wireless base station, and a second reply channel, associated with a second wireless base station, to provide a respective first demodulated signal and a second demodulated signal, (b) decode the first demodulated signal to provide a first message, (c) decode the second demodulated signal to provide a second message, wherein the decoding of the first demodulated signal is independent of the decoding of the second demodulated signal, and (d) select one of the plurality of decoded messages for use in recovering channel assignment information during call setup.

3. The apparatus of claim 2 wherein the receiver comprises a RAKE receiver structure.

4. A method for use in a wireless mobile station of a wireless communication system during an access state of the wireless communication system, the method comprising the steps of:

transmitting a message to at least one wireless base station of the wireless communication system, the message representative of a call setup state of operation;

using message reception diversity to select one of a plurality of messages, each message independently decoded from one or more of a plurality of different demodulated received signals, the different received signals representing reply channels from a plurality of wireless base stations of the wireless communication system, the messages representing channel assignment information.

5. A wireless mobile station for a wireless communication system, the wireless mobile station comprising:

a transmitter configured, during an access state of the wireless communication system, to transmit a message to at least one wireless base station of the wireless communication system, the message representative of a call setup state of operation; and a receiver configured, during the access state, to use message reception diversity by (a) demodulating different received signals, the different received signals representing reply channels from a plurality of wireless base stations of the wireless communication system, (b) decoding the different demodulated received signals to provide a plurality of messages, each message independently decoded from one or more of the plurality of wireless base stations and the messages representing channel assignment information, and (c) selecting one of the plurality of messages.

* * * * *